May 26, 1959

R. O. DECKER ET AL 2,888,549

CONTROL APPARATUS

Filed Dec. 22, 1955

R. O. DECKER ET AL 2,888,549

CONTROL APPARATUS

Filed Dec. 22, 1955

United States Patent Office 2,888,549
Patented May 26, 1959

2,888,549

CONTROL APPARATUS

Richard O. Decker, Murrysville, George F. Pittman, Jr., McCandless Township, Allegheny County, Robert I. Van Nice, Shaler Township, Allegheny County, and John P. Conner, Beaver, Pa., William G. Hall, Ridgewood, N.J., and William G. Evans, Monroeville, Pa., assignors to Westinghouse Electric Corporation, East Pittsburgh, Pa., a corporation of Pennsylvania Application December 22, 1955, Serial No. 554,828

13 Claims. (Cl. 219—80)

This invention relates to control apparatus and has particular relation to apparatus for producing automatically a sequence of operations particularly adaptable to industrial automation. While in its broader aspects this invention is applicable to automation of any general type, this invention in its specific aspects concerns itself with the control of a welder for joining work with a series of welds, and in this application the invention will be described with reference to a welder for bus duct in a control for which the invention has actually been embodied.

Bus duct is made up of a pair of side plates which are joined by top and bottom plates into a rectangular duct or tube. At least the top plate is joined to the side plates by resistance welding. For this purpose, an assembly consisting of the top plate and the adjacent side plates is passed between welding electrodes, and welded spots are produced at intervals. In producing the joint, the first step is to convey the assembly to a position between welding electrodes on a conveyor. The assembly is held on this conveyor by one or more pressure rollers. Then, a sequence timer is actuated to cause the electrodes to engage the top and side plates and to produce a weld. After the weld is produced, the electrodes are disengaged from the work and then the plate is advanced and the above-described process is repeated.

In producing the joints, it is necessary not only that the welds be of proper quality but also that the transmission of current between the welding electrodes at improper times be positively avoided. This necessarily requires a highly precise and reliable sequencing control unit. Apparatus in accordance with the teachings of the prior art is available for this purpose and has been found to operate reasonably satisfactorily, but it is highly complex and costly including a large number of mechanical relays.

Reliable apparatus of simple structure which is a marked improvement over the above-described prior art apparatus is disclosed in Patent 2,827,545, granted March 18, 1958, to John P. Conner and Richard T. Bright. In the Conner-Bright apparatus, the control is effected by transistor circuits. This apparatus has operated satisfactorily but at intervals has required servicing. Since the making of bus duct is a mass production process and any shutdown of the apparatus results in serious economic loss, it is desirable that the servicing demanded by the apparatus be minimized, and it is broadly an object of this invention to provide a highly precise and reliable control of simple but rugged structure for sequencing the operation of welding apparatus of which the bus duct welder is typical, which control shall be long lived and shall require a minimum of servicing.

In accordance with this invention in its specific aspects, control apparatus is provided for a bus duct welder which is made up of a plurality of Logic units of the inductive type so interconnected as to cause the various parts of the welder and its associated components to operate for the proper durations in the proper timed relationship. Specifically, there is a plurality of Flip-Flop networks. One of these is controlled by a Not network so as to prevent any operation of the apparatus unless the work is properly seated on the welder. This Flip-Flop network controls the engagement and disengagement of the welding electrodes from the work. Another of the Flip-Flop networks controls movement of the work. This Flip-Flop network is tied in through a Not nework to the first Flip-Flop network so that the work cannot be advanced until after the welding electrodes have been engaged with the work, a weld has been carried out and the welding electrodes have been disengaged from the work. Provisions are also included through an Or network to permit indexing of the work independently of the second Flip-Flop network. A third Flip-Flop network assures proper timing of the operation of the sequence timer with relation to the other components of the welder.

It is desirable in the interest of economy, in cost of apparatus and in operation that the control Logic networks be relatively small and thus of relatively high impedance. In accordance with this invention, the relatively small high impedance Logic networks are connected to actuate the principal components of the welder; that is, the sequence timer, the welding electrodes and the work-advancing mechanism, through amplifiers having an input impedance matching the impedances of the Logic networks of the control apparatus and an output capable of actuating the various components.

The inductive units which compose the control apparatus are of rugged structure requiring a minimum of servicing. The life of this apparatus is for all practical purposes limitless. Thus, the apparatus provided is capable of operating continuously with substantially no failures and with a minimum of economic loss from shutdown.

Figure 3A:
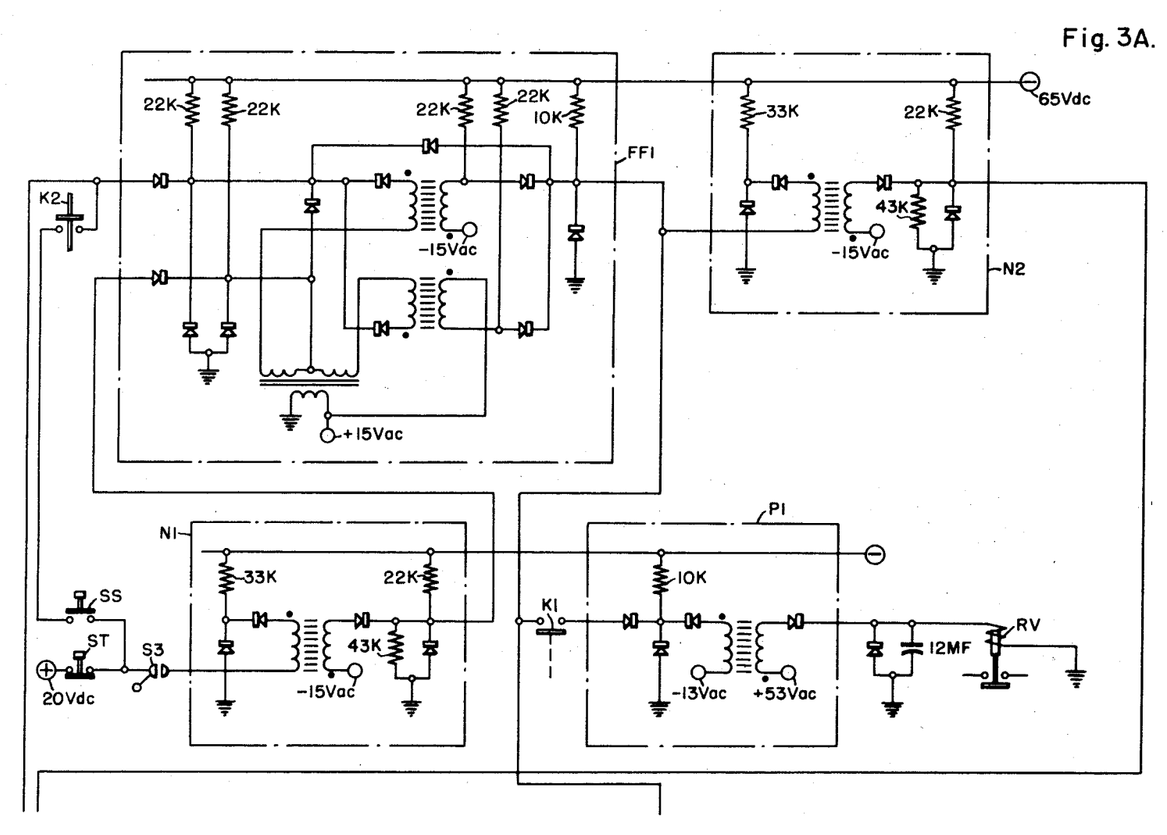
Figs. 3A, 3B, 3C together constitute a circuit diagram similar to that shown in Figs. 2A, 2B, 2C, but with the component magnitudes specified.
Figure 3B:
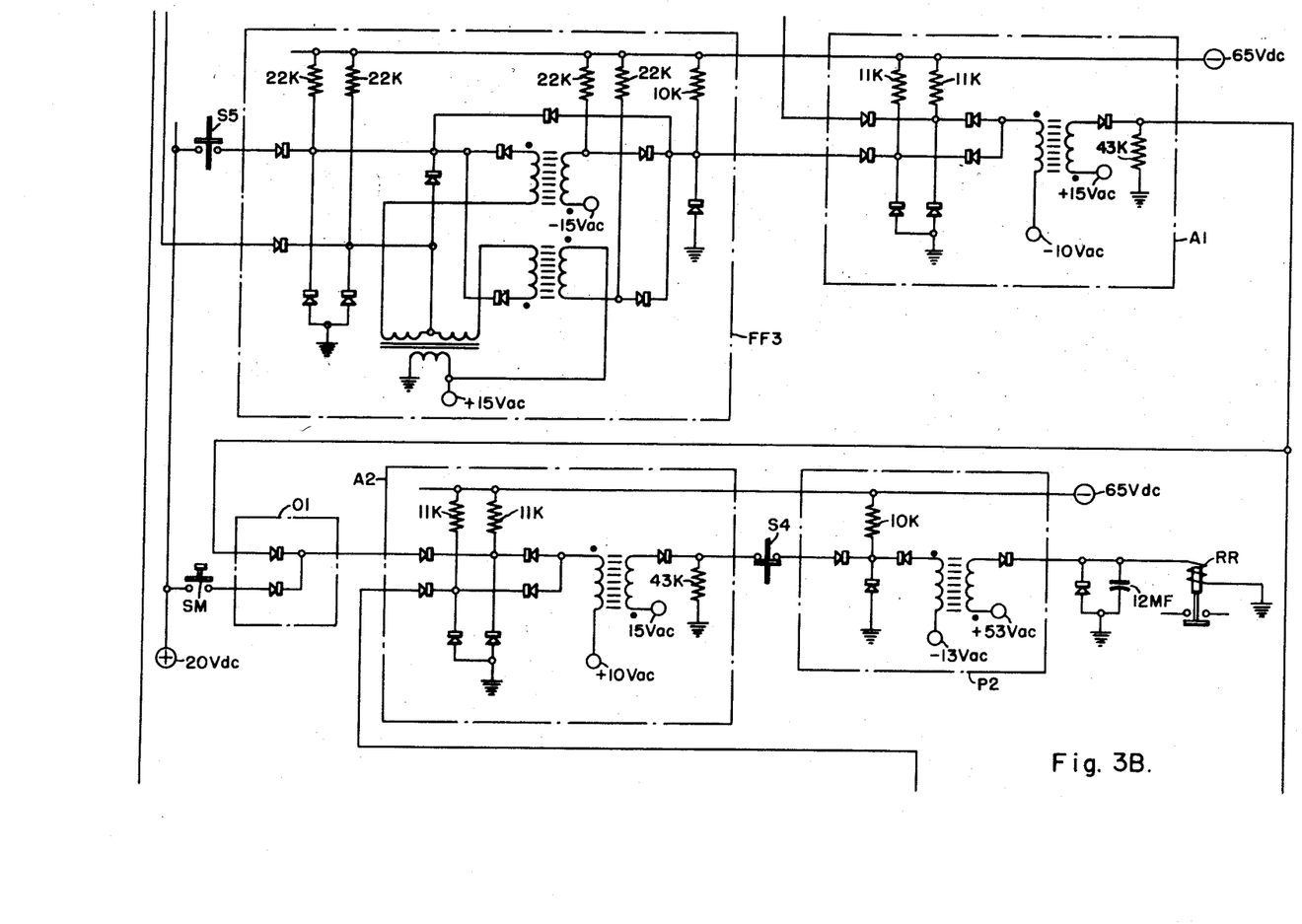
Figure 3C:
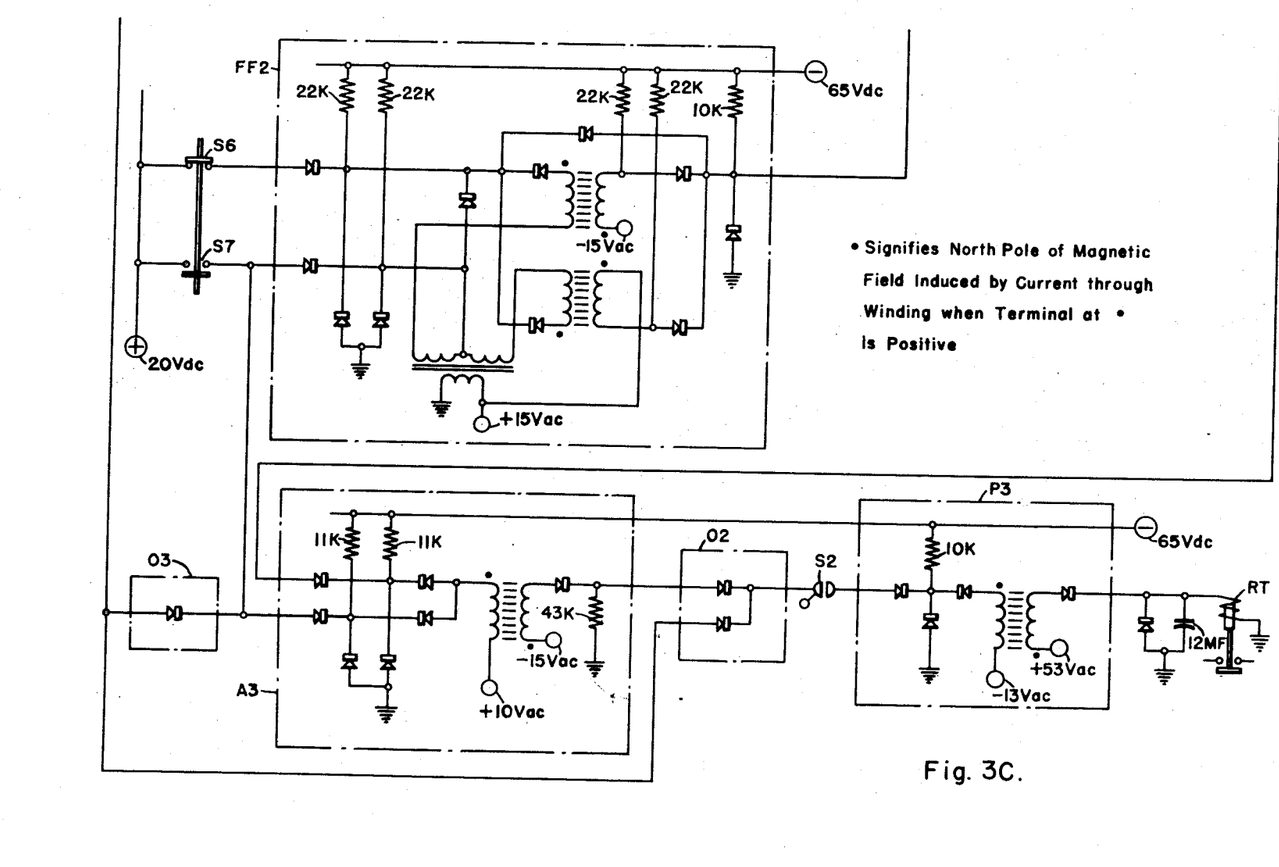

The novel features considered characteristic of the invention are disclosed generally above. The invention itself, both as to its organization and its method of operation, together with additional objects and advantages thereof, will be understood from the following description of a specific embodiment taken in conjunction with the accompanying drawings, in which:

Figs. 3A, 3B, 3C are being presented with the thought of helping those skilled in the art to practice the invention and should not, in any way, be regarded as limiting the scope of this invention.

The apparatus disclosed here includes a number of rectifiers. These are represented by symbols including an arrow. The invention adopted is that the arrow points in the direction of positive current flow; that is, in the direction of the flow of ions or holes and opposite to the direction of flow of electrons.

Description

Figure 1:
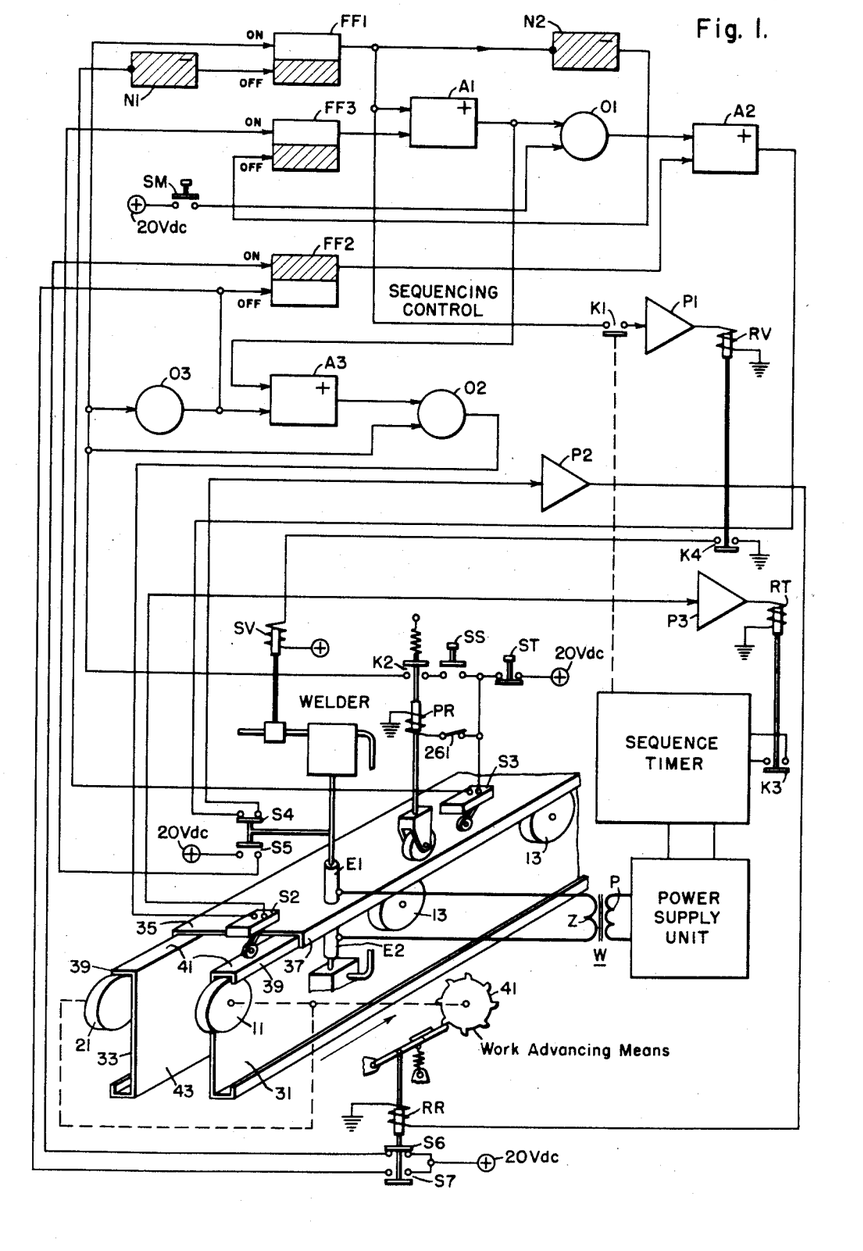
Figure 1 is a diagrammatic view showing welding apparatus as it is connected to a control in accordance with this invention.

In Fig. 1 a complete system for welding bus duct is shown. This system includes a Welder, a Sequencing Control, a Power Supply Unit, and a Sequence Timer.

The Welder includes a conveyor made up of a pair of arrays of spaced rollers 11 and 13 and 21, at least one roller 11 and 21 of each pair being driven by work-advancing means. The parts of the bus duct to be joined include side walls 31 and 33, each of channel cross-section, and a top 35 of C cross-section. The top 35 is suspended across the side walls 31 and 33 with its flanges 37 engaging the cooperative edges 39 extending from the flanges 41 of the side walls 31 and 33. The top 35 is welded along its edges to the flanges 41 of the side walls by which it is engaged. For this purpose, the top and the side walls are combined into a unitary structure and transmitted by the roller conveyor 11—13—21 through the Welder. In being assembled, the top is disposed on the side walls 31 and 33 so that a portion 43 of the side walls extends beyond the top 35 in the direction opposite to the direction of movement, represented by an arrow, of the unit through the Welder.

The Welder may include separate electrode units for welding the top 35 to each of the side walls 31 and 33, but for purposes of clarity, only one electrode unit is shown. This unit includes a pair of welding electrodes E1 and E2 between which the secondary Z of a welding transformer W is connected. The primary P of the transformer W is connected to be supplied from the Power Supply Unit, which is, in turn, controlled from a Sequence Timer. The Sequence Timer and the Power Supply Unit may be of any type available in the art. Specifically, they may be of the type disclosed in an application Serial No. 424,094, filed April 19, 1954, to Hubert W. Van Ness, entitled "Electric Discharge Apparatus," or in an application Serial No. 490,872, filed February 28, 1955, to Hubert W. Van Ness and William E. Large, for "High Speed Resistance Welding Apparatus."

The Sequence Timer usually times squeeze, weld, hold, and off intervals of a welding operation and may be set for so-called non-beat operation; that is, for operation such that when a starting switch of the Sequence Timer is momentarily closed, the timer passes through a single sequence. Such a starting switch is the contact K3 which is actuable by the timer relay RT of the Sequencing Control.

The electrodes E1 and E2 are disposed so as to engage the regions to be welded of the top and side walls 35 and 31 as the work passes through the roller conveyor 11—13—21. The electrodes E1 and E2 are urged into engagement with the work and disengaged from the work by fluid pressure means. This means is controlled by a solenoid SV supplied through a contact K4 of a relay RV in the Sequencing Control, when a contact K1 of a relay in the Sequence Timer is closed at the beginning of the squeeze interval of the Sequence Timer. The fluid pressure means is so connected to both electrodes E1 and E2 that they are both disengaged from the work during the interval between welds when the work is to be advanced through the conveyor.

The Welder also includes a plurality of switches S2, S3, S4, and S5. The switch S2 is disposed on the side of the welding electrodes E1 and E2 in the direction from which the work passes through the conveyor, and the switch S3 is disposed on the other side of the welding electrodes. The switches S2 and S3 are closed when the work is in the conveyor, switch S2 being closed by a single thickness of the work, and switch S3 by two thicknesses of the work. Switches S4 and S5 are actuable in dependence upon the position of the electrodes E1 and E2, switch S4 being closed only when the electrodes E1 and E2 are disengaged from the work and are in a position most remote from the work and switch S5 being closed only so long as the electrodes are in engagement with the work.

For advancing the work, a ratchet mechanism is provided. This mechanism includes a ratchet wheel 41 actuable by a pawl or arm 43. The wheel 41 is in driving engagement with the rollers 11 and 21 which drive the work. The pawl 43 is actuable by solenoid RR of the Sequencing Control. When the solenoid RR is energized, it causes the pawl to rotate the wheel 41 to advance the work. When the solenoid RR is deenergized, the pawl is retracted to its original position by a spring 45.

Switches S6 and S7 are associated with the ratchet mechanism. Switch S6 is closed only with the pawl 43 fully retracted; that is, when it is in a position ready to advance the ratchet wheel 41. Switch S7 is closed only with the pawl 43 in the position in which it is just after it has completed an advancing operation.

The work is held in engagement with the conveyor and in condition to be welded by a pressure roller PR which may be solenoid actuated and which includes a contact K2 closed when the work is held in position to be welded by the roller.

Figure 2A:
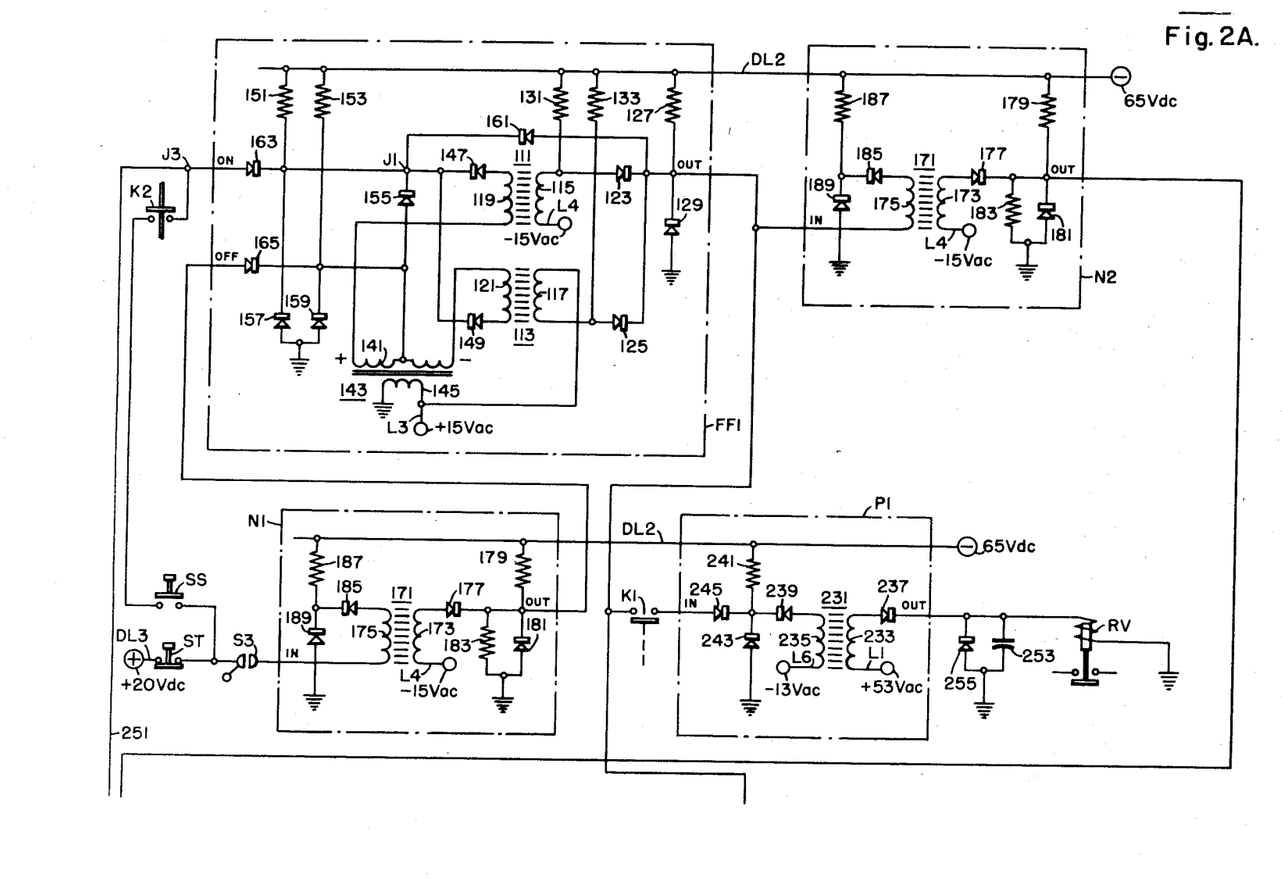
Figs. 2A, 2B, 2C together constitute a circuit diagram of a preferred embodiment of this invention.
Figure 2B:
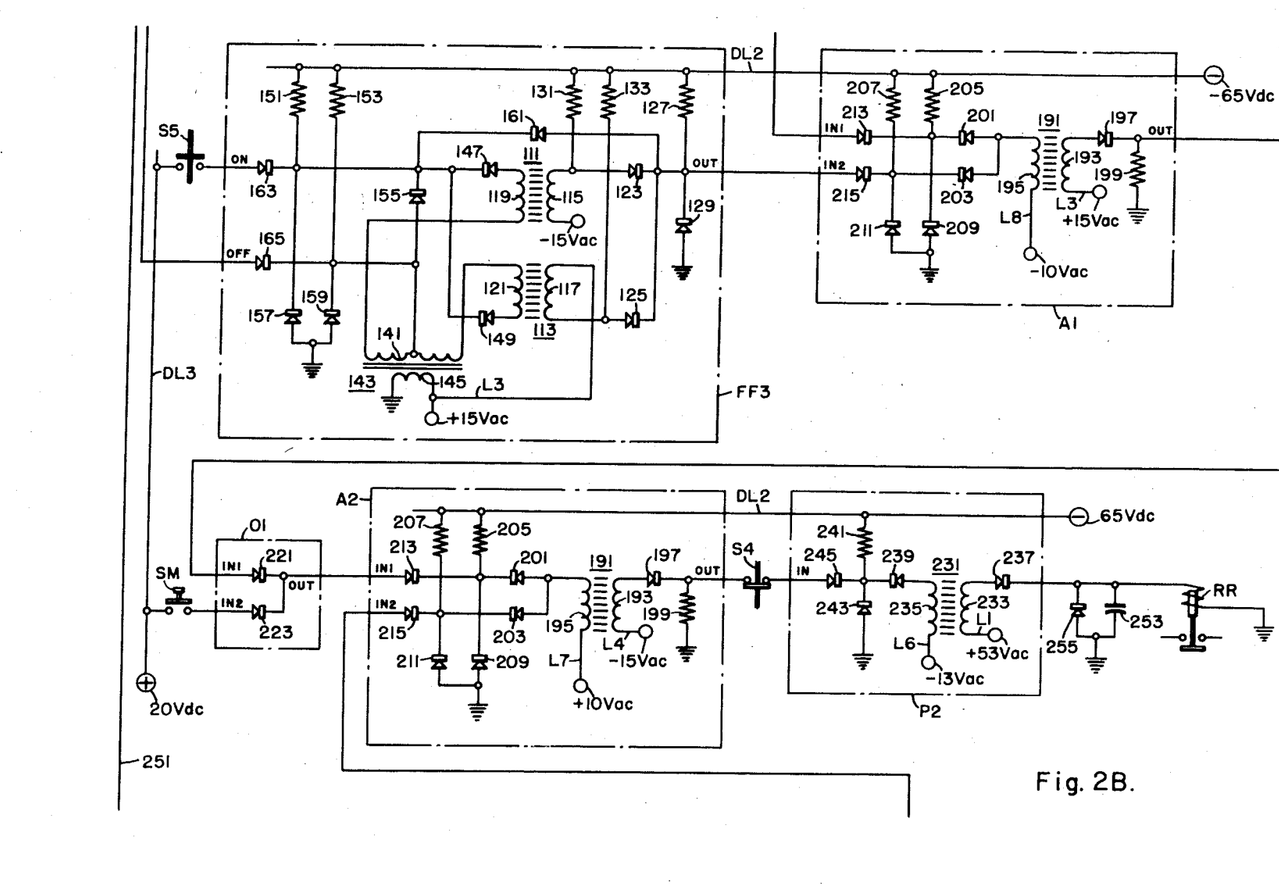
Figure 2C:
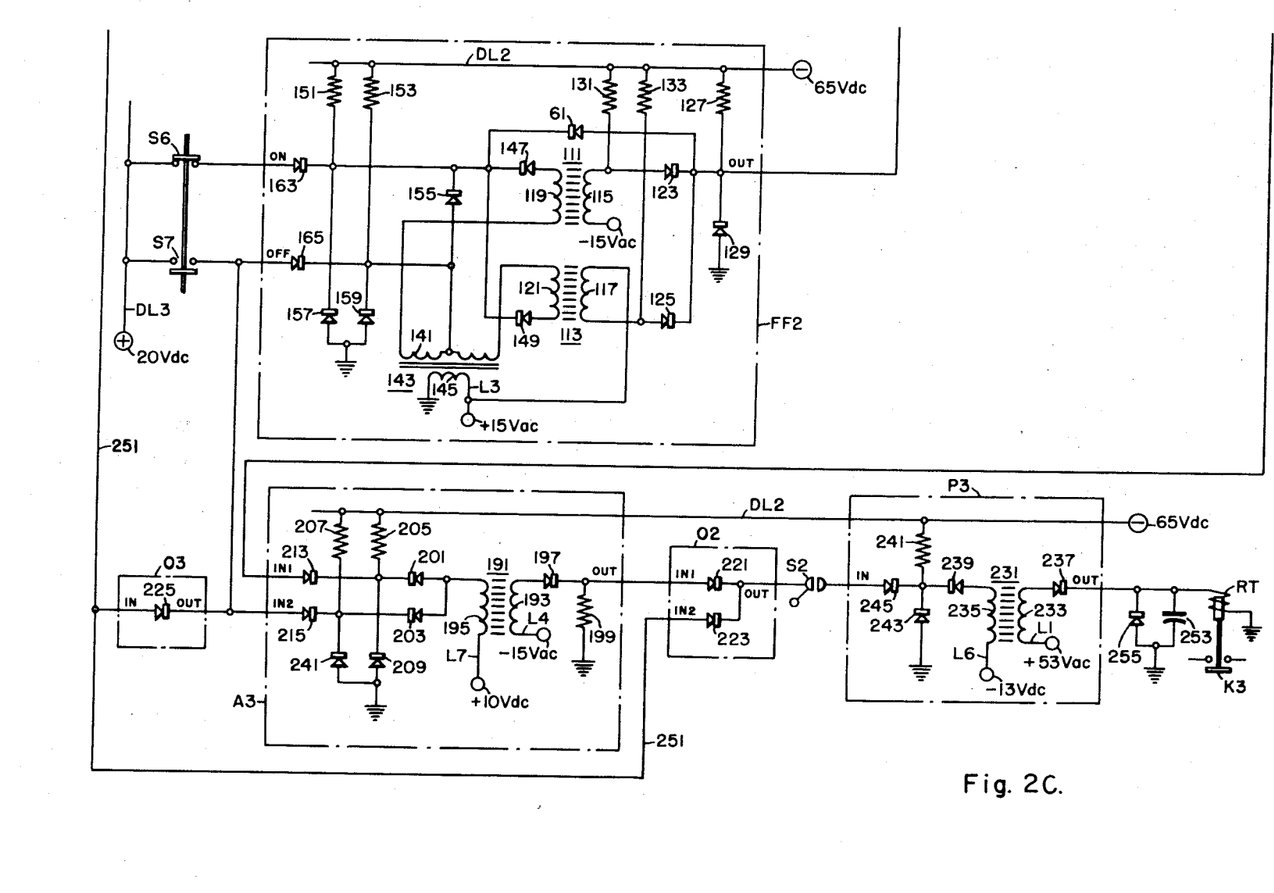

The Sequencing Control includes a plurality of Flip-Flop networks FF1, FF2, and FF3, a pair of Not networks N1 and N2, a plurality of And networks A1, A2, and A3, and a plurality of Or networks O1, O2, and O3. These units operate on the Welder through a plurality of Amplifiers P1, P2, P3. The apparatus also includes a start switch SS, a stop switch ST and an indexing switch SM. The apparatus is supplied with different voltages from a plurality of different conductors, alternating voltages being supplied between conductor L1 and ground, between conductors L3 and L4, between ground and conductor L6 and between conductors L7 and L8. In addition, direct current is supplied between ground and conductor DL2 and between conductor DL3 and ground. Suitable magnitudes for the various potentials supplied are indicated in Figs. 2A, 2B, and 2C. These potentials have been found to be suitable. Other potentials may, of course, be applied provided that the proper relationship is maintained. The alternating voltage magnitudes carry a plus or minus symbol. These symbols are intended to indicate the instantaneous polarity of the voltages and thus the phase relationship of the voltages impressed on different terminals of the apparatus.

Logic elements of the general type suitable for the Sequencing Control are disclosed in detail in the following publications:

(1) "Magnetic Logic Circuits for Industrial Control Systems," W. G. Evans, W. G. Hall, R. I. Van Nice, AIEE Transactions Paper, Winter Meeting, 1956.

(2) "Design Methods for Magnetic Switching Element Control System," R. I. Van Nice, AIEE Transactions Paper, Winter Meeting, 1955.

(3) "The Single-Core Magnetic Amplifier as a Computer Element," R. A. Ramey, AIEE Communication and Electronics, January 1953, Number 4.

(4) "On the Control of Magnetic Amplifiers," R. A. Ramey, AIEE Transactions, vol. 70, part II, 1951.

(5) "Arithmetic Operations in Digital Computers," R. K. Richards, D. Van Nostrand Co., Inc. 1955.

The basic component of these elements is a highly saturable plural winding induction transformer which has a substantially rectangular hysteresis loop. In the following discussion, these transformers will be referred to as saturable transformers to distinguish them from supply transformers.

*Description of Flip-Flop*

Each of the Flip-Flop networks FF1, FF2, and FF3 includes a pair of saturable transformers 111 and 113 each having a gating winding 115 and 117 and a resetting winding 119 and 121. Potential is supplied to the gating windings from the conductors L3 and L4, conductor L3 being connected to a terminal of one of the windings 117 and conductor L4 to a terminal of the other 115. The remaining terminals of the gating windings 115 and 117 are connected DL2 through respective rectifiers 123 and 125 and a common resistor 127, and is returned through DL2 and −65VDC to ground. A rectifier 129 is also connected between ground and the junction of the first-mentioned rectifiers 123 and 125 and the resistor 127. The output terminal (herein designated Out) of each Flip-Flop network is at the junction of the rectifier 129 and the resistor 127. To improve the operation of the rectifiers 123 and 125 of each Flip-Flop network, the terminals of the gating windings 115 and 117 which are connected to the rectifiers 123 and 125 are also connected to conductor DL2 through associated resistors 131 and 133.

The resetting windings 119 and 121 are each supplied from the secondary 141 of a transformer 143 having a primary 145 connected between conductor L3 and ground. The terminals of the secondary 141 are connected each to a terminal of an associated resetting winding 119 and 121. The other terminals of the resetting windings 119 and 121 are connected through respective rectifiers 147 and 149 and through a common resistor 151 to the conductor DL2 and through this conductor to ground. The secondary 141 has an intermediate tap which is connected through a resistor 153 to conductor DL2 and through it to ground. This intermediate tap is also connected to the junction of the rectifiers 147 and 149 through another rectifier 155. The resistors 151 and 153 are also each connected to ground through rectifiers 157 and 159. There is a feedback connection through a rectifier 161 from the Out terminal to the junction of the rectifiers 147 and 149 connected to the resetting windings.

Each Flip-Flop network has an On terminal connected to the junction of the rectifiers 147 and 149 through a rectifier 163 and an Off terminal connected to the intermediate tap of secondary 141 through a rectifier 65.

*Operation of Flip-Flop*

In explaining the operation of the Flip-Flop network, network FF1 may be considered. It may be assumed that at the instant of operation, the polarities of the potential impressed on conductors L3 and L4 and on the secondary of the transformer are as indicated, and that the network has not been affected by a signal at the On terminal. A gating pulse then flows from conductor L3 through winding 117, rectifier 125, resistor 127, to conductor DL2, and from DL2 to ground. During the succeeding half period, a gating pulse flows from conductor L4 through winding 115, rectifier 123, resistor 127 to conductor DL2, and through it to ground. During the latter half period, a resetting pulse flows from the right-hand terminal of the secondary 141 through the resetting winding 121, rectifier 149, resistor 151, to conductor DL2. During the following half period, a resetting pulse flows from the left-hand terminal of the secondary 41 through the resetting winding 119, rectifier 147, resistor 151, to DL2. Following each of the resetting pulses, the impedance of the associated gating winding 115 or 117 is high so that the potential between the Out terminal and ground is low and a feedback pulse does not flow through the rectifier 161 from the Out terminal to the junction J1 of the rectifiers 147 and 149. If unaffected by an On signal, Flip-Flop FF1 thus continues to operate with no output potential so long that it is so unaffected.

Now assume that just after transformer 113 has been gated from conductor L3, a potential is impressed through the On terminal on junction J1 so as to block the flow of resetting pulses to conductor DL2. During the succeeding half period when the gating winding 115 associated with conductor L4 is being supplied with a gating pulse, there is no resetting pulse supplied to the resetting winding of the other saturable transformer 113. During the next half period (the second half period following the gating of 113) then, the impedance of this transformer is low and there is a potential at the Out terminal. During this half period, this potential is impressed through the feedback connection on junction J1 preventing the flow of a resetting pulse through this junction and transformer 111 which was gated during the prior half period (the first half period following the gating of 113) is not reset. The output potential then continues at the Out terminal and also at junction J1 and resetting of the transformer 113 is prevented. Thus, the resetting of transformers 111 and 113 is automatically prevented and there is a signal at the Out terminal. Since the maintenance of the signal at Out terminal depends only on the feedback connection, a signal impressed on the On terminal even instantaneously produces an out signal which continues to be present after the On potential or signal disappears.

Now if after the Flip-Flop FF1 has been actuated to the On condition, a potential is impressed on the Off terminal, this potential appearing between junctions J1 and J2 counteracts the potential at J1. This has the effect of again permitting a resetting pulse to flow through whichever resetting winding is connected to the positive terminal of the secondary 141 and to reset the transformer. Assume that this is the resetting winding 121 of the transformer 113 associated with conductor L3. Once this winding is reset, there is no signal at the Out terminal during the succeeding half period and during this succeeding half period there is no feedback potential so that a resetting pulse may flow through the other resetting winding 119 resetting the second transformer 111, and thus eliminating the output potential entirely. Thus, Flip-Flop FF1 may be set to produce output potential with a signal on its On terminal, and once so set, continues to produce output potential, and it may be reverted to a condition in which it produces no output potential by a signal at its Off terminal, and once so reverted, remains in the latter condition.

*Description Not network*

Each of the Not networks N1 and N2 includes a saturable transformer 171 having a gating winding 173 and a resetting winding 175. The gating winding 173 is connected to conductor L4 at one terminal and at the other through a rectifier 177 and a resistor 179 to conductor DL2. The resistor 179 is connected to ground through a rectifier 181 shunted by another resistor 183. The Not network has an output (Out) terminal at the junction of the rectifiers 177 and 181 and the resistors. Gating potential is supplied to the gating winding during the half periods when conductor L4 is positive.

The resetting winding 175 is connected at one terminal to the In terminal of the network. At the other terminal it is connected through a rectifier 185 and a resistor 187 to conductor DL2. The resistor 187 is also connected to ground through a second rectifier 189.

So long as resetting potential is not supplied to the In terminal, the transformer 171 remains gated at low impedance and there is an output at the Out terminal. The impressing of a potential at the In terminal resets the transformer 171 during each resetting half period and the gating winding 173 has a high impedance thus substantially eliminating the potential at the Out winding.

*And network*

Each And network includes a saturable transformer 191 having a gating winding 193 and a resetting winding 195. One terminal of each of the gating windings is connected either to conductor L3 or to conductor L4 depending on the phase of the gating pulse desired. This phase must be properly set where Logic networks are cascaded so that a resetting signal supplied to the following network is in proper phase relationship to the gating signal of the network, that is occurs after the following network is gated and not while it is being gated. The other terminal is connected to ground through a rectifier 197 and a resistor 199. The resetting winding 195 is connected at one terminal to conductor L7 or conductor L8 depending on the phase of the potential impressed on the corresponding gating winding 193. The other terminal of the resetting winding 195 is connected through a plurality of rectifiers 201 and 203 and a plurality of resistors 205 and 207 to conductor DL2. The junctions of the rectifiers 201 and 203 and the resistors 205 and 207 are each connected to ground through an associated rectifier 211 and 213. Each And network has a plurality of In terminals corresponding in number to the number of signals required to produce output at the Out terminal. Each In terminal is connected through a rectifier 213 and 215 to the junction of an associated resistor 207 and 205 and rectifier 201 and 203.

Operation And network

For an understanding of the operation consider And network A1. During the gating half period, a gating pulse flows through the gating winding 193 from conductor L3, gating the transformer 191. If there is no signal potential impressed on any one or on both of the In terminals, a path is provided during the resetting half period through the rectifier 201 or 203 or both and the resistor 205 or 207 or both at the junction of which no input signal is impressed. Thus, the transformer 191 is reset during each alternate half period and there is no potential at the Out. If a signal potential is impressed on both of the In terminals, the flow of a resetting pulse is prevented and output potential appears at the Out terminal.

Or network

The Or networks O1 and O2 each includes a number of rectifiers 221 and 223 corresponding to the number of alternative signals to be impressed. The rectifiers are all connected to conduct to a common junction, and an Or output signal appears at this common junction if a potential is impressed on either or both of the rectifiers 221 and 223.

Or network O3 includes a single rectifier 225.

Amplifier

The Amplifiers P1, P2 and P3 each includes a saturable transformer 231 having a gating winding 233 and a resetting winding 235. Each gating winding 233 is connected at one terminal to conductor L1 and at the other terminal through a rectifier 237 to the Out terminal.

The resetting winding 235 is connected at one terminal to conductor L6 and at the other through a rectifier 239 and a resistor 241 to conductor DL2. A rectifier 243 is also connected between the resistor 241 and ground. Each Amplifier has an In terminal connected to the junction of resistor 241 and rectifier 239 through a rectifier 245.

In the absence of input potential at the In terminal resetting current flows during each resetting half period through the resetting winding 235. This resets the transformer 231 so that the potential at its output is small. A signal impressed on the In terminal of the Amplifier prevents resetting of the transformer 231 and a signal appears at the Out terminal. Depending on the relative impedances at the In and the Out terminals of the transformer 231, the signal at the output may be of relatively high magnitude as compared to the signal at the input.

Conductor DL3 provides the signals for starting the operation of the apparatus. This conductor is adapted to be connected to a junction J3, through stop switch ST, start switch SS, contact K2. Junction J3 is connected to the On terminal of Flip-Flop FF1. The Off terminal of FF1 is connected to the Out terminal of network N1. The Out terminal of FF1 has three output connections; the In of Not network N2, contact K1 through which it may be connected to the In of Amplifier P1, and one In of And network A1. The In of Not network N1 is adapted to be connected to DL3 through stop switch ST and work responsive switch S3. The On of Flip-Flop FF3 is adapted to be connected to conductor DL3 through electrode responsive switch S5. The Off of FF2 is connected to the Out of Not network N2. The Out of Flip-Flop FF3 is connected to the other In of And network A1. The On of Flip-Flop FF2 is connected to conductor DL3 through the contact S6 of the work-advancing switch when the ratchet is fully retracted.

The Off of Flip-Flop FF2 is adapted to be connected to conductor DL3 through the other contact S7 of the Flip-Flop FF2. This Off is also connected to the Out of Or network O3, the In of which is connected to conductor 251. The same connection also is adapted to connect DL3 to one In of And network A3 through contact S7. The Out of Flip-Flop FF2 is connected to one In of And network A2.

There are two connections to the Out of And network A1, one to one of the In terminals of Or network O1 and another to one of the In terminals of And network A3. The other In terminal of network O1 is adapted to be connected to conductor DL3 through the index switch SM. The Out of And network A2 is connected to the In of Amplifier P2 through the switch S4 which is closed when the electrode is retracted. The Out of And network A3 is connected to one In of Or network O2. The Out of Or network O2 is adapted to be connected through the work responsive switch or contact S2 to the In of Amplifier P3. The Out of Amplifier P1 is connected to actuate relay RV, the Out of Amplifier P2, relay RR and the Out of Amplifier P3, relay RT. The coil of each of the relays RV, RR, RT is shunted by a capacitor 253 to prevent chattering and by a rectifier 255.

Standby

For convenience in describing the apparatus in standby and in operation the In terminals of multiple input terminal networks A1, A2, A3, O1 and O2 will be numbered and referred to as In1 and In2.

In the standby condition of the apparatus, the power supply conductors L1, L3, L4, L6, L7, L8, DL2 and DL3 are energized. When there is no work on the work-advancing conveyor 11—13—21, switches K2, S2 and S3 are open. In addition, switch SS is also open. There is then no input signal impressed on network N1. This network has an output signal which is supplied to the Off of Flip-Flop FF1, maintaining it in the Off position so that it has no output. Not network N2 then has an output which, in turn, is impressed on the Off of Flip-Flop FF3 so that it has no output. Since there is no potential at the Out of Flip-Flop FF1, there is no potential at contact K1. There is also no potential at In1 of And network A1 from the Flip-Flop FF3. There is then no output potential on And network A1 and no potential on In1 of Or network O1. Since the index switch is at this time open, there is no potential at In2 of Or network O1 and no potential on In1 of And network A2.

There is no output potential on And network A2 and no potential impressed on the In of Amplifier P2 so that ratchet relay RR is deenergized and contact S6 is closed and contact S7 open. Flip-Flop FF2 is then in the On condition and there is output potential at the Out of this network which is impressed on In2 of network A2. But the latter has no output potential because In1 has no signal impressed thereon. In addition, with S7 open there is no potential from DL3 on In2 of And A3. Since conductor 251 is disconnected from DL3, there is no potential on In of Or network O3 and no signal through Or network O3 on In2. Since there is thus no potential at the Out of And network A3 there is none at the In of Or network O2. In addition, contact S2 is open. There is then no input on Amplifier P3 and relay RT is deenergized so that its contact K3 is open and the Sequence Timer is in the standby condition. Since the Sequence Timer is in the standby condition, contact K1 is open and Amplifier P1 has no output so that relay RV is in the deenergized condition, and the electrodes E1 and E2 are retracted from the work. Contact S4 is then closed and contact S5 is open.

Operation

When the apparatus is to be operated, the work parts 35, 31 and 33 are disposed on the work-advancing rolls 11, 13 and 21. When the work is properly positioned on the rollers 11, 13 and 21, switches S2 and S3 are closed. There is a connection at switch S2 between the Out of network O2 and the In of Amplifier P3. At switch S3 there is a connection between conductor DL3 and the In terminal of network N1. The signal then disappears from the Out of network N1 and from the Off terminal of Flip-Flop FF1. Flip-Flop FF1 remains off but may flop to on when an On signal is impressed on its On. Further, a switch 261 is closed to apply current to the solenoid PR of the pressure roller and pressure is applied to the work part 35. In addition, on the application of pressure contact K2 is closed and an On signal may be impressed through contact K2 on the On terminal of Flip-Flop FF1.

To start the welding, the start switch SS is closed. This connects conductor DL3 to the junction J3. Through conductor 251, an input is now impressed on Or network O2. In addition, the On of FF1 receives a signal so that an output signal appears at its Out. Further through Or network O3 a signal is impressed on Off of FF2 causing its output signal to disappear. This maintains A2 without a signal at In2 so that regardless of In1 it has not output and there is no signal on the In of P2 to actuate relay RR.

The potential now on 251 is impressed through the contact S2 and Or network O2 on the In of amplifier P3. P3 is then prevented from resetting and there is current flow through the gating winding and the coil of the relay RT to actuate this relay.

The actuation of relay RT closing contact K3 starts an operation of the Sequence Timer. At the beginning of the squeeze interval of the Sequence Timer, the start relay RT of the Sequence Timer is actuated and contact K1 closes. Contact K1 remains closed until the end of the hold interval. On the closing of contact K1, the signal available at the Out of Flip-Flop FF1 is impressed on the In of Amplifier P1 preventing the transformer 231 of this Amplifier from resetting and producing output through the coil of relay RV. Relay RV is then actuated causing the electrodes E1 and E2 to move into engagement with the work. As soon as this movement starts, contact S4 opens preventing the impressing of a signal from the Out of A2 on the In of P2 and operation of the ratchet. The Sequence Timer is set for non-beat, and its timing cycle continues independently of whether contact K3 is open or closed. Thus, the start switch SS may be released, and the signal impressed through Or network O3 on the Off of Flip-Flop FF2 disappears and the latter reverts to the On condition. Potential then appears at In2 of And network A2. If electrode E2 has by this time engaged the work there is also potential on In1 but actuation of Amplifier P2 is prevented because S4 is open.

When the electrodes E1 and E2 are seated on the work contact S5 closes impressing an On signal on the On of FF3 which produces a signal at its Out. The latter is impressed on In2 of And network A1 and since there is a signal at the In1 from output of Flip-Flop FF1, there is an output signal at the Out of And network A1. This signal is impressed through Or network O1 on the In of And network A2.

It appears desirable to digress and discuss the phase relationship of the potentials impressed on cascaded networks such as A1 and A2. The "hot" terminal of gating winding 193 of And A1 is connected to L3 while the "hot" terminal of winding 193 of A2 is connected to L4. Since L3 and L4 are at opposite phase, A1 and A2 are gated in opposite phase. The output signal of A1 is then in opposite phase to the gating signal of A2 and is thus in the proper phase relationship to block the corresponding resetting signal for A2.

Now returning to the operation, the Sequence Timer continues to time causing welding current to flow at the end of its squeeze interval and holding the electrodes E1 and E2 in engagement with the work during the hold interval. At the end of the hold interval contact K1 is opened. Relay RV is then deenergized permitting the electrodes E1 and E2 to be retracted from the work. Switch S5 then opens and then switch S4 closes.

The opening of switch S5 does not affect Flip-Flop FF3, since there is no signal from network N2 at its Off terminal. Network FF3 remains in the On condition producing an output signal which is impressed at In2 of network A1. The other signal on A1 is also present from the output of Fip-Flop FF1. Thus, there is an output signal from network A1 and an input signal to one of the terminals In1 at network A2. The other input signal is also present from Flip-Flop FF2 and with the switch S4 closed, there is an input signal on Amplifier P2 so that the transformer 231 of the latter is prevented from resetting and the relay RR is actuated. The actuation of relay RR causes rotation of the ratchet mechanism 41 and advancement of the work. The work may now freely advance because the electrodes E1 and E2 are retracted from the work.

As soon as the ratchet arm 43 starts to move the ratchet S6 opens, but S7 also remains open and FF2 remains in the On condition. The operation of solenoid RR continues unaffected. When the arm 43 has been moved to the fully advanced position and ratchet 41 has moved the work to this position S7 closes, FF2 reverts to the Off condition, the output signal disappears from A2 and P2 is reset and RR is deenergized so that the ratchet arm 43 starts to return to its retracted position. S7 is now opened but FF3 is in Off condition since S6 does not close until arm 43 is fully retracted. A weld is completed when the ratchet reaches its advanced position and S7 closes.

It is of interest to consider the condition of the apparatus at the end of this weld. At this time start switch SS is open so that there is no potential on conductor 251. But there is a signal at the In of Not network N1 impressed through the stop switch ST and contact S3 and Not network N1 produces no output signal. Flip-Flop FF1 then remains in the On condition in which it was set at the beginning of the operation. Not network N2 then produces no output signal. There is a signal available for actuating Amplifier P1 when K1 closes, and there is a signal at In1 of And network A1. Further, there is no Off signal impressed on Flip-Flop FF3 (through N2) and it remains in the On condition in spite of the fact that contact S5 is open. And network A1 then has an output which is impressed on And network A2 and And network A3. Since the ratchet arm 43 is in the fully advanced position, Flop-Flop FF2 is in the Off condition and there is no signal at the output of network A2 so that the ratchet Amplifier produces no output and the arm is about to be returned. Before the arm 43 starts to return there is a signal from conductor DL3 through contact S7 on In2 of And network A3. Since this And network also has a signal In1 from A1, there is a signal at Out of A3 and through the Or network O2, and the Sequence Timer is actuated through Amplifier P3 regardless of the fact that the switch SS is open.

On the renewed actuation of the Sequence Timer, a new timing cycle is started. As the timing of the cycle starts, the ratchet relay RR being deenergized, the ratchet arm 43 returns to the retracted position. While the ratchet arm 43 is returning, contact K1 is closed by the Sequence Timer actuating amplifier P1 and relay RV so that the engagement of the electrodes E1 and E2 with the work starts. On the start of the engagement of the electrodes with the work, contact S4 immediately opens preventing actuation of Amplifier P2 and of the relay RR. At this point the ratchet arm 43 is fully retracted and S6 is closed reverting FF2 to the On condition. There is no signal at the In2 of A2, but this has no effect since contact S4 is now open.

The electrodes E1 and E2 then continue to move into engagement with the work and eventually a weld is produced. Following the production of the weld and the timing out of the subsequent hold interval, contact K1 opens, relay RV is reverted to the unactuated condition, contact S4 closes and contact S5 opens. The closing of contact S4 causes actuation of the ratchet Amplifier P2 and of the relay RR. This causes the ratchet wheel 41 to advance the work and the apparatus to reset for a third operation as described above.

The welding now continues until the top 35 has been welded to the flanges 41. Near the end of the welding operation, contact S2 reaches a point where it contacts only the flanges 41 but this has no effect on the continuance of the welding operation since contact S2 is closed by only a single thickness of the work being welded. This permits the last weld to be produced.

If it should be desirable to stop the welding at any time during the operation, the stop switch ST is opened. This removes the input potential from Not network N1 producing output potential at its Out terminal and applying Off potential to Flip-Flop FF1. The disappearance of output potential for Flip-Flop FF1 removes the signals from Not network N2, the input to Amplifier P1 and one of the inputs to And network A1 preventing further operation of the system.

When it is desirable to index the work without producing a weld independently of the welding operation, switch SM is closed. This switch causes a signal to be impressed on In1 of And network A2, and since in the standby condition Flip-Flop FF2 produces an output signal impressed on In2 the ratchet relay RR is actuated to advance the work. The ratchet arm 43 is then actuated to move the ratchet wheel over one tooth. This causes Flip-Flop FF2 to be reverted to the Off condition in turn causing the output of Amplifier P2 to disappear and ratchet relay RR to be deenergized. The ratchet arm RR is then returned to the retracted position and if the index switch SM is still closed another indexing operation may take place.

*Conclusion*

The Flip-Flop networks FF1, FF2, FF3, the And networks A1, A2, A3, the Not networks N1 and N2 and the Or networks O1, O2, O3 are of small dimensions and of high output impedances. These output impedances are matched by the input impedances of the Amplifiers P1, P2, P3.

While a preferred embodiment of this invention has been disclosed herein, many modifications thereof are feasible. The invention, therefore, is not to be limited except insofar as is necessitated by the spirit of the prior art.

We claim as our invention:

1. In combination with apparatus for welding work having switch means to be closed on proper seating of said work in said apparatus, welding electrode means, and means for actuating said welding electrode means to engage said work, a Flip-Flop network having on, off and output terminals, a Not network having input and output terminals, means connecting said output terminal of said Flip-Flop network to said actuating means to actuate said actuating means on the appearance of a signal at said last-named output terminal, means including said switch means for impressing a signal on said input terminal of said Not network on the closing of said switch means, means connecting the output terminal of said Not means to the off terminal of said Flip-Flop network, and means connected to said On terminal for impressing a signal on said On terminal.

2. In combination a Flip-Flop network having an on terminal and off terminal and an output terminal, a first Not network having an input terminal and an output terminal, a second Not network having an input terminal and an output terminal, means connecting said output terminal of said first Not network to the off terminal, means connecting the output terminal of the Flip-Flop network to the input terminal of the second Not network, and means for impressing a signal on said on terminal.

3. In combination, a Flip-Flop network having an on terminal and off terminal and an output terminal, a first Not network having an input terminal and an output terminal, a second Not network having an input terminal and an output terminal, a conductor adapted to impress a signal, means connecting said output terminal of said first Not network to the off terminal, means connecting the output terminal of the Flip-Flop network to the input terminal of the second Not network, and switch means operable in sequence first to connect said conductor to the input terminal of the first Not network and then connect said conductor to the on terminal.

4. In combination a Flip-Flop network including on, off and output terminals, means connected to said on and off terminals for impressing signals to control the operation of said network, and a plurality of additional Logic networks connected to said output terminal, the output impedance of said Flip-Flop network being of the order of 10,000 ohms and the input impedances of said additional Logic networks each being of the order of 10,000 ohms.

5. Welding apparatus for welding work, including switch means responsive to said work to be closed when said work is positioned for welding in said apparatus, welding electrode means, actuating means connected to said welding electrode means to actuate said welding electrode means to engage said work, a Flip-Flop network having on, off and output terminals, a Not network having input and output terminals, means including said switch means for impressing a signal on said input terminal on the closing of said switch means, means connecting said output terminal of said Not network to said off terminal, connections between the output terminal of said Flip-Flop network and said actuating means for actuating said means to operate on the appearance of a signal at the output terminal of said Flip-Flop network, and means for impressing a signal on said on terminal.

6. In combination, a first Flip-Flop network having an output terminal, a second Flip-Flop network having on, off and output terminals, an And network having first and second input terminals and an output terminal, a Not network having an input terminal and an output terminal, means connecting the output terminal of the first Flip-Flop network to the input terminal of the Not network, means connecting the output terminal of the first Flip-Flop network to the first input terminal of the And network, means connecting the output terminal of the Not network to the off terminal of the second Flip-Flop network, means connecting the output terminal of the second Flip-Flop network to the second input terminal of the And network, and means connected to the on terminal of the second Flip-Flop network for impressing a signal on said on terminal.

7. In combination a first Logic network including a saturable transformer having a gating winding and a resetting winding and having at least one input terminal and an output terminal, a second Logic network including a saturable transformer having a gating winding and a resetting winding and having an output terminal, means connected to said resetting winding for supplying resetting potential thereto, a pair of conductors between which an alternating current is to be derived, a first rectifier, means connecting in series one of said conductors, said first rectifier and said gating winding and said output terminal of said first Logic network, a second rectifier, means connecting in series said other conductor, said second rectifier and said gating winding and said output terminal of said second Logic network, said one conductor being electrically nearest said gating winding of said first network, means connected to said second network, and means connecting said output terminal of said first network to block the supply of resetting potential to said resetting winding of said second network.

8. In combination a first Logic network and a second Logic network each having an input terminal and an output terminal, means connecting said output terminal of said second network, means connected to said first network for supplying a gating potential to said first network, means connected to said second network for supplying a gating potential to said second network, means connected to said first network for supplying a resetting potential to said first network, means connected to said second network to supply a resetting potential to said first network, means connected to said second network to supply a resetting potential to said second network, an output potential at the output terminal of said first network being capable of counteracting said resetting potential on said second network, and means connected to the input terminal of said first network adapted to impress a potential on said input terminal of said first network to counteract the resetting potential on said first network, said gating potential impressed on said output terminal of said first network being in opposite phase to the gating potential in the output terminal of said second network and the resetting potential on the input terminal of said first network being in opposite phase to the resetting potential on the input terminal of said second network.

9. In combination, a Flip-Flop network including on, off and output terminals, means connected to said on and off terminals for impressing signals to control the operation of said network, and a Not network, an Amplifier and an And network connected to said output terminal, the output impedance of said Flip-Flop network being of the order of 10,000 ohms and the input impedances of said Not and And networks and said Amplifier each being of the order of 10,000 ohms.

10. In combination, a first Flip-Flop network having an output terminal, a second Flip-Flop network having on, off and output terminals, and And network having first and second input terminals and an output terminal, a Not network having an input terminal and an output terminal, means connecting the output terminal of the first Flip-Flop network to the input terminal of the Not network, means connecting the output terminal of the first Flip-Flop network to the first input terminal of the And network, means connecting the output terminal of the Not network to the off terminal of the second Flip-Flop network, means connecting the output terminal of the second Flip-Flop network to the second input terminal of the And network, and means connected to the on terminal of the second Flip-Flop network for impressing a singal on said on terminal, said impressing means including switch means for controlling the impressing on said signal and means responsive to said first Flip-Flop network for actuating said switch means.

11. In combination with apparatus for welding work having switch means to be closed on proper seating of said work in said apparatus, welding electrode means, and means for actuating said welding electrode means to engage said work, a Flip-Flop network having on, off and output terminals, means connected to said off terminal for maintaining said Flip-Flop in the off condition in the standby condition of said combination, means connecting said output terminal of said Flip-Flop network to said actuating means to actuate said actuating means on the appearance of a signal at said last-named output terminal, means including said switch means connected to said maintaining means and responsive to the closing of said switch means for causing said maintaining means to permit said Flip-Flop to pass from its off to its on condition on the impressing of a signal on said on terminal, and means connected to said on terminal for impressing a signal on said on terminal.

12. Welding apparatus for welding work, including switch means responsive to said work to be closed when said work is positioned for welding in said apparatus, welding electrode means, actuating means connected to said welding electrode means to actuate said welding electrode means to engage said work, a Flip-Flop network having on, off and output terminals, means connected to said off terminal for maintaining said Flip-Flop in the off condition in the stand-by condition of said combination, means including said switch means connected to said maintaining means and responsive to the closing of said switch means for causing said maintaining means to permit said Flip-Flop to pass from its off to its on condition on the impressing of a signal in said on terminal connections between the output terminal of said Flip-Flop network and said actuating means for actuating said means to operate on the appearance of a signal at the output terminal of said Flip-Flop network, and means for impressing a signal on said on terminal.

13. Welding apparatus for welding work including welding electrodes to engage said work, means for transmitting welding current through said electrodes and said work, means when conditioned for advancing said work, sequencing means including start means and means responsive to actuation of said start means and connected to said electrodes for causing in succession said electrodes to engage said work, welding current to be transmitted through said work and said work to be advanced, said work advancing means having a retracted position and an advanced position and said advancing means moving from said retracted position to said advanced position in advancing work, a Flip-Flop having on, off, and output terminals, simultaneous signals on said on and off terminals maintaining said Flip-Flop in off condition with no signal at said output terminal, means connecting said output terminal to said work-advancing means and responsive to said welding electrodes when said electrodes are out of engagement with said work to condition said work advancing means to move from a retracted to an advanced position when there is a signal at said output terminal, means connected to said advancing means and to said on terminal for impressing a signal on said on terminal while said advancing means is in retracted position, and means connecting said off terminal to said start means for impressing a signal on said off terminal on the actuation of said start means.

References Cited in the file of this patent

UNITED STATES PATENTS

| | | |
|---|---|---|
| 2,224,733 | Konig et al. | Dec. 10, 1940 |
| 2,264,175 | Dawson | Nov. 25, 1941 |
| 2,284,403 | Marquart | May 26, 1942 |
| 2,590,582 | Stadum et al. | Mar. 25, 1952 |
| 2,760,085 | Van Nice | Aug. 21, 1956 |
| 2,760,086 | Van Nice | Aug. 21, 1956 |
| 2,786,147 | Kaufman | Mar. 19, 1957 |